Patented Mar. 2, 1954

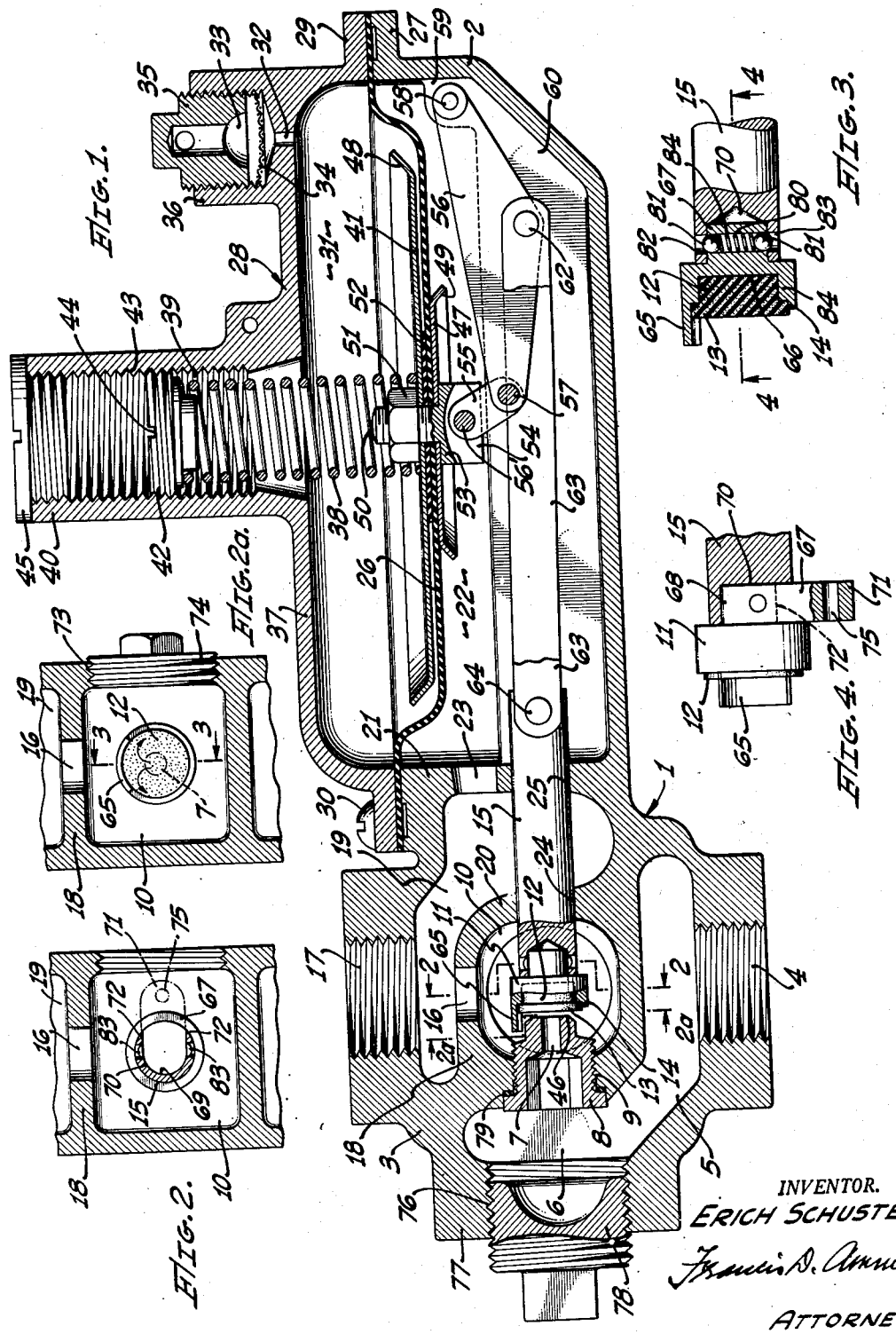

2,670,574

UNITED STATES PATENT OFFICE 2,670,574

FLUID PRESSURE REGULATOR

Erich Schuster, Downey, Calif., assignor to Utility Regulator Company, a corporation of California Application June 11, 1948, Serial No. 32,421

5 Claims. (Cl. 50—26)

This invention relates to fluid pressure regulators, and particularly to a type of regulator that is employed for regulating the delivery pressure of gas to a consumer's service line. In regulators of this type it is the function of the regulator to supply the gas to the consumer in such quantities that the pressure of the gas at the point of consumption, for example, an oven or stove, will remain substantially constant.

It has been the general practice heretofore to maintain a pressure chamber in which gas is maintained under pressure, and when a consumer commences to burn an increased quantity of gas, the pressure in this chamber immediately becomes reduced. Pressure controlled means in the chamber, which is responsive to this reduction in pressure, automatically controls a valve which is admitting gas to the regulator, and will automatically open this valve to deliver an increased quantity of gas to the consumer. Conversely, if the consumer suddenly reduces the number of burners he is employing, a regulator such as referred to will automatically reduce the effective opening of the regulator valve so as to reduce the quantity of gas flowing to the burners.

Heretofore regulators of this type have operated in such a way that as the gas flows from the regulator valve toward the outlet into the consumer's line, the outflow of the gas exerted a certain degree of entraining action to withdraw gas from the pressure chamber referred to. This mode of operation is generally satisfactory in pressure regulators operating on relatively low pressure, but under conditions where the inlet pressure into the regulator is relatively high, the eduction effect or withdrawal effect of gas from the pressure chamber is less reliable in effecting control of the position of the pressure controlled member that in turn controls the amount of opening of the regulator valve.

One of the objects of this invention is to provide a regulator of this type with features of construction which will greatly increase the range of inlet pressure through which the regulator can operate satisfactorily.

In regulators of this type it is common practice to have the inlet orifice emerge upon a valve seat, or seat face, opposite to which a valve head is movably mounted, and the position of this valve head is automatically regulated through the agency of a pressure chamber. After the gas passes this regulator valve, it passes through an outlet that delivers it into the consumer's service line. Upon a sudden increase in the consumption of the gas by a consumer, a sudden reduction in the pressure of the gas at the delivery outlet of the regulator is immediately occasioned, and this develops a tendency for the gas issuing through the regulator valve to develop a condition known to users of gas as "channeling"; that is to say, there is a tendency for the gas issuing from the valve to flow directly toward the outlet; one of the objects of this invention is to provide means for preventing this channeling effect which is undesirable, and to provide means for substantially preventing it. This is particularly desirable when the regulator operates under relatively high inlet pressures.

Another object of the invention is to provide a regulator of this type, with a plenum chamber into which the fluid or gas is delivered within the regulator, and from which the gas flows toward the delivery outlet of the regulator, my general purpose being to provide a regulator in the mode of operation of which the regulator will respond promptly but steadily and without fluctuation, to sudden changes in the amount of gas required by the consumer.

In regulators of this type the valve head referred to above is usually mounted on the end of a stem, and the shifting of this stem controls the effective area of flow for the gas at the inlet orifice. These valve heads must be inspected from time to time to ascertain whether they are in good condition. As there is practically little or no clearance between the valve head and the valve seat, which is usually formed on the end of a nipple, it is usually necessary to remove the nipple that carries the valve seat, and also an access plug that is located behind the nipple. And after this has been done, it is difficult to reach and remove the valve head from the valve stem, to make a close inspection of it.

This invention adapts itself readily to the provision of a mounting for the valve head on the stem that will enable the valve head to be placed on the stem by a lateral movement toward the stem. By employing such a connection it is only necessary to remove a single access plug located at the side of the casing in order to gain access to the valve head, and remove it for inspection, and for replacement if that is necessary.

Further objects of the invention will appear hereinafter.

The invention consists in the novel parts and combinations of parts to be described hereinafter, all of which contribute to produce an efficient fluid pressure regulator.

A preferred embodiment of the invention is described in the following specification, while the broad scope of the invention is pointed out in the appended claims.

In the drawing:

Fig. 1 is a vertical section through a fluid regulator embodying my invention, certain parts being broken away, and other parts shown partially in section and partially in elevation.

Fig. 2 is a vertical section taken on the line 2—2 of Fig. 1, passing through the end portion of the stem that carries the removable valve head or closure, and particularly illustrating details of a disconnectible connection that I prefer to employ for mounting the valve head on its stem.

Fig. 2a is an elevation of the forward end of the valve head taken about in the plane of the line 2a—2a of Fig. 1. This view also shows the walls of the plenum chamber in section, as in Fig. 2.

Fig. 3 is a vertical section through the forward end of the valve stem, and through the valve head, taken about on the line 3—3 of Fig. 2a. This view is upon a larger scale than Fig. 2a, and further illustrates the means for mounting the valve head on its stem. The stem is shown partially in elevation and broken away.

Fig. 4 is a horizontal section taken about on the line 4—4 of Fig. 3 looking upwardly. This section, however, passes through the end of the stem, and the view shows a portion the shank for holding the valve head broken away and partially in section.

Referring more particularly to the parts, in practicing the invention I employ a regulator case or casing 1 which is formed as a casting having a substantially cylindrical body 2 with an extension 3 projecting from its side. The fluid to be regulated is admitted into the interior of the extension 3 through an inlet 4 which is threaded to facilitate connecting an inlet pipe to the same. Through this inlet the fluid flows into a relatively large duct 5 which has an extension 6 that extends up into the outer end of the extension 3 so as to admit the fluid through a valve port or inlet 7. This valve port is usually carried at the forward end of a removable nipple 8, the body of which is mounted in a thread connection 9 in one of the walls of the walled plenum chamber 10 into which the fluid such as illuminating gas flows from the valve inlet 7.

In order to regulate the flow of the gas through this port 7, I prefer to employ a valve head or valve closure 11 which has an annular body that carries a gasket or plug 12 preferably of rubber, fiber, or other suitable material. The body of this plug is of course of circular form to fit into the bore of the annular valve head, and it has an enlarged head 13 at its forward end that fits into a small counterbore 14 in the forward face of the valve head.

The means for mounting this valve head on the valve stem 15 will be described more fully hereinafter. Reference is now had to the plenum chamber or valve chest 10 which is completely walled in on all sides except for an outlet or outlet orifice 16 at its upper wall, that is preferably substantially in line with the delivery outlet 17 for the gas that flows from the regulator. This outlet is usually threaded as shown, to facilitate the attachment of the consumer's pipe line to it.

The space above the upper wall 18 of the plenum chamber is an extension of an antechamber 19, the main portion of which is located at the right of the inner wall 20 of the plenum chamber, and lies adjacent to the forward wall 21 of the regulator body 2 which separates this antechamber from the pressure chamber 22 of the regulator, and with which it communicates through an orifice 23.

The valve stem 15 is guided through guide openings 24 and 25 formed in the walls 20 and 21, and its inner end that extends into the interior of the pressure chamber 22, is connected to linkage that is connected to pressure responsive means, the movements of which are controlled and affected by the pressure existing in the pressure chamber 22. Any suitable pressure controlled member the area of which is exposed to the chamber pressure, may be employed. In the present instance the drawing illustrates a common type of diaphragm 26, which is of circular form with its edge overlying the flange 27 of the cylindrical body 2 of the regulator. The bonnet 28 of the regulator seats over the diaphragm and its flange 29 is secured to the flange 27 by spaced bolts or machine screws such as the machine screw illustrated at 30.

The bonnet 28 is of the usual inverted dish form so as to form a chamber 31 which, in practice, carries a fluid the pressure of which partially balances the fluid pressure in the pressure chamber 22. When this regulator is used for industrial purposes, pressure in this chamber 31 can be developed by means of fluid carried in a fluid system and maintained at any desired pressure. However, when this invention is employed in the construction of an ordinary gas regulator to control delivery of gas to a consumer, this chamber 31 is merely an air chamber connected by a vent 32 to the atmosphere. This vent 32 preferably communicates with the atmosphere through a screen chamber 33 provided with a screen 34 to prevent insects or other foreign bodies from passing down through the vent 32. This screen chamber 33 is closed above by a removable plug 35 that is mounted in a threaded socket formed in a boss 36 projecting upwardly from the cover wall 37 of the bonnet. Plug 35 is vented to atmosphere, but substantially weatherproof.

The outward or upward movement of the diaphragm 26 that would be occasioned by an increase of pressure in the pressure chamber 22 is yieldingly resisted by means such as the usual coil spring 38, the upper end of which extends up into a spring chamber 39 in the threaded bore of a tubular neck 40 that is preferably cast integrally with the body of the bonnet 28. The lower end of this spring thrusts against the upper washer 41 attached to the upper side of the diaphragm, and the upper end thrusts against an adjustable screw plug 42 that is threaded into the threads 43 of the inner face of the wall of the neck 40. This screw plug 42 may have a screwdriver slot 44 for rotating it in either direction to increase or decrease the degree of compression of the spring 38. Access is had to the plug 42 by removing a screw cap 45 that is threaded into the upper end of the neck 40.

Any suitable linkage means may be employed for imparting movements of the diaphragm 26 to the stem 15 to cause the forward face of the valve plug 12 to approach or recede from the flat seat face 46 through which the inlet orifice 7 of the valve emerges.

In order to effect a connection from the diaphragm to the linkage that effect shifting of the valve stem 15, a lower washer 47 is provided, located concentrically with the diaphragm and the upper washer 41. The washers 41 and 47 are preferably formed of metal, and are of dish form, the upper washer 41 being formed with an upwardly inclined flange 48 while the flange 49 of the lower washer is inclined downwardly. The diaphragm 26 may be made of any material usually employed in regulators of this kind, and in making the connection to the linkage, a pivot bolt 50 is provided that extends up from below through the two washers 47 and 41, and the diaphragm, the upper end of the bolt being threaded to receive a nut 51 that clamps these parts together. This connection preferably includes a cushion washer 52 of the same material as the diaphragm 26.

The pivot bolt 50 is formed with an enlarged head 53 at its lower end, that is provided with two slots such as the slot 54, to receive the upper ends of two short links 55 that are attached to the pivot bolt 50 by a horizontal cross pin or rivet 56'. These links extend down alongside of each other, and the space between them receives the forward end of the fulcrum lever 56 to which they are pivotally attached by a cross pin or rivet 57. The fulcrum lever 56 is anchored on a horizontally disposed pivot pin 58 that is supported as illustrated at 59, on the side wall of a bottom extension 60 that is of channel form, to house the fulcrum lever 56 and the other parts of the linkage. The fulcrum lever is of substantially triangular form in side elevation, and at its lower angle or inverted apex 61 it is attached by a transverse pivot pin 62 to a pair of links 63 that extend over to the opposite sides of the valve stem 15 to which they are attached by a cross pin or a pivot 64.

The employment of a plenum chamber 10 such as I have described and illustrated, increases the efficiency of performance of regulators of this type, and greatly increases the range of inlet pressures with which it can function satisfactorily to pass the gas in sufficient quantity and at the proper rate of flow to supply varying requirements of the consumer. The efficient operation of the plenum chamber under higher pressures is augmented by providing means within it for baffling direct flow from the inlet orifice 7 of the valve through the outlet orifice 16. In order to accomplish this, I provide baffle means between the inlet 7 and the outlet orifice 16, preferably consisting of, or including, a projecting lip or baffle 65. This lip, as illustrated in Fig. 2a, is of arcuate form to conform to the periphery of the valve head, and it projects forward past the seat face 46 of the valve nipple 8. When gas flows from the inlet orifice or valve port 7 against the forward face of the plug 12, it of course is deflected by the plug so that it flows in a plane substantially at right angles to the axis of the valve head radially on the forward face of the plug. The portion of this gas current that flows upwardly will be deflected laterally as indicated by the arrows in Fig. 2a. At the same time the gas that flows in under this lip becomes denser, and due to this and its rebounding effect from impinging upon the under side of the lip, returns downwardly within the plenum chamber 10. In this way I prevent flow of an excessive quantity of gas upwardly from the inlet 7, and this insures that the radial flow of gas between the seat face 46 and the forward face of the plug 12 is more uniformly distributed. While this lip 65 is not an essential feature when this regulator is operating on relatively low inlet pressures, it is a desirable feature when the regulator is receiving its gas supply at a relatively high pressure. In this connection I have found in practice that this regulator having this plenum chamber and baffle means can operate efficiently with inlet gas pressures ranging from one to seventy-five pounds per square inch. There is of course some turbulence occasioned in the gas within the plenum chamber, in addition to the effect of preventing "channeling" of the inflow stream from the inlet orifice 7 directly to the outlet orifice 16 of the plenum chamber.

I shall now describe the disconnectible mounting for the valve head on its stem 15. Referring particularly to Figs. 2 to 4, inclusive, in conjunction with Fig. 1, the valve head 11 as stated, is of substantially circular form. The rear wall 66 of the valve head (see Figs. 3 and 4) is provided with a shank 67 at its rear face, which may be formed integrally with the bottom wall as shown in Fig. 3. The outline of this shank is illustrated in dotted lines in Fig. 2. Its inner end is formed with a curved face 68 milled on the same radius as the bottom 69 of a socket 70 (see Figs. 2 and 4) that is cut into the side of the stem 15. This shank 67 is of uniform width and thickness, and its outer end projects beyond the periphery of the head 11 and operates as a handle 71 that can be held in one's hand to push the head laterally onto the stem 15 through the mouth of the socket in the stem, and between the two side edges 72 of this socket.

Access is had to the interior of the plenum chamber through a threaded opening 73 that is closed by a removable threaded plug 74. In order to facilitate withdrawing the valve head, the handle 71 of the shank may be provided with a small eye 75 (see Fig. 4) in which a hook can be inserted to pull the shank 67 out of the socket 70.

In order to enable the guide openings 24 and 25 to be drilled through the walls 20 and 21, an opening 76 is provided in the outer end wall 77 of the extension 3 of the regulator. The presence of this opening 76 also enables an opening to be drilled in the outer wall of the plenum chamber and tapped to form the threaded seat for the valve nipple 8. After a threaded plug 78 that closes this opening 76 has been removed, the nipple 8 can be removed if that ever becomes necessary. The flange of this nipple preferably seats against the usual gasket 79.

In order to hold the valve head 11 yieldingly in its socket, the inner end of the shank is provided with a bore 80 in the ends of which two balls 81 are placed. After the balls 81 are put in position, the edges 82 of the mouths of this bore are peened over to retain the balls while permitting them to project out considerably from the upper and lower faces of the shank. When the shank is pushed all the way into position, these balls snap up into small circular sockets 83 that are drilled in the upper and lower sides of the socket 70. These balls operate as yielding latches, and will move inwardly against the force of their common spring 84, if the shank is forcibly pulled out of the socket.

The mode of operation of this regulator is substantially as follows: If a consumer opens up a greater number of burners than the regulator is supplying, then the pressure in the antechamber 19 will decrease. This will cause a flow of fluid from the pressure chamber 22 through the communicating port 23 into the antechamber, whereupon the diaphragm will be pushed further down by the air pressure in the air chamber 31, and by the spring 38. This will swing the pivot pin 62 of the link 63 downwardly in its arc of movement, which will shift the valve stem 15 and the valve head 11 away from the inlet orifice 7. This of course gives an increased effective area of flow for the gas coming through the valve port 7, which gas will flow into the plenum chamber 10, out through the outlet orifice 16 directly toward the delivery outlet 17. The passage of this current of gas under increased pressure through the end of the antechamber 19, has a certain amount of eductive action tending to reduce the pressure in the antechamber, and this augments the flow of gas under pressure from the pressure chamber 22. In other words, there is a kind of regenerative action due to the fact that the outlet orifice 16 from the plenum chamber is in line with the delivery outlet 17.

It will be evident that although I have described my plenum chamber employed in connection with a fluid regulator of a specific type, it should be understood that this plenum chamber can be employed with regulators having any automatic pressure control means with which it can function to control the degree of opening of the valve. The presence of the plenum chamber gives the capacity of the regulator to operate under a great range of inlet pressures; and one of the advantages of the plenum chamber is that it eliminates undesirable effects in the regulator, which might be developed by variations in the inlet pressure. In other words, the plenum chamber steadies the operation of the instrument under relatively high pressures by tending to maintain a substantially constant pressure in the plenum chamber. This, of course, results in giving a relatively steady educting effect of the fluid as it flows through the orifice 16 to the outlet 17. If the consumer supplied through the regulator, opens up additional burners for the fluid, the pressure in the pressure chamber 22 will immediately become reduced, and this reduction in pressure will also occur in the space between the orifice 16 and the outlet 17, which will increase the velocity of flow of the fluid from the plenum chamber. This increased velocity of flow from the plenum chamber will increase the eduction effect upon pressure chamber 22. This gives a quick response of the regulator to changes and requirements of the consumer. If, on the other hand, the consumer shuts off some of the burners that have been in use, an opposite character of eduction effect upon the pressure chamber 22 will occur.

In connection with Fig. 2, it should be understood that this view shows the diaphragm not in a working position, but in a position such as it would assume when there is no pressure in the pressure chamber 22. In practical operation, when pressure exists in this pressure chamber 22, the diaphragm 26 would lie in a position more elevated than that in which it is shown, and in a position in which the links 55 would have their longitudinal axes in a substantially vertical position. It is important that the links 55 should be in a substantially vertical position when the diaphragm is at its normal level, because there is then no substantial horizontal component of the thrust of the links that could tend to shift the diaphragm laterally, and so that the lower end of the spring would be way out of line with the upper end.

Of course in adapting this regulator to operate at different pressures, it is necessary to adjust the plug 42 up or down in the interior of the threaded neck 40.

Many other embodiments of the invention may be resorted to without departing from the spirit of the invention.

I claim as my invention:

1. In a fluid pressure regulator, the combination of a casing having a pressure chamber therein, a pressure-responsive member having an area exposed to the pressure of said pressure chamber, said casing having a plenum chamber with an inlet for the said fluid, and having a wall surrounding and substantially confining the fluid admitted into the plenum chamber, a movable closure co-operating with said inlet to regulate the effective area of flow for the fluid in flowing from said inlet to said plenum chamber, said casing having a delivery outlet therefrom for the fluid, and also having an outlet orifice for conducting fluid from the plenum chamber to the delivery outlet, an antechamber within the casing maintaining communication from said pressure chamber to said delivery outlet, means co-operating with said pressure responsive member for resisting its outward movement under the action of an increase of pressure in said pressure chamber, and means connecting the said pressure-responsive member to said movable closure operating to move the closure toward or from the said outlet responsively to changes in pressure occurring in said pressure chamber; means for baffling flow of the fluid from the plenum chamber inlet past said movable closure to said outlet orifice of the plenum chamber; all of said parts co-operating to develop and maintain a substantially static pressure in said plenum chamber when an increased amount of fluid is being required by the consumer and being drawn off through said delivery outlet.

2. A fluid pressure regulator according to claim 1, in which the said baffle means is carried on said movable closure and located between the said inlet orifice and the said outlet orifice for preventing channeling of fluid from said inlet orifice to said outlet orifice, thereby augmenting the plenum chamber effect.

3. In a fluid pressure regulator, the combination of a casing having a pressure chamber therein, a pressure-actuated member having an area exposed to the pressure of said pressure chamber, said casing having a walled plenum chamber therein with an inlet for the said fluid, a movable closure to regulate the effective area of flow for the fluid passing into said chamber from said inlet, said casing having a delivery outlet therefrom for the fluid, and also having an outlet orifice through the wall of said chamber for conducting fluid from the chamber to flow through the delivery outlet, means for effecting communication from said pressure chamber to said delivery outlet, means associated with the plenum chamber for baffling flow of the fluid therefrom, operating to build up and maintain pressure in the same when the fluid is flowing through the same and means connecting the said pressure-controlled member to said movable closure to move the same in response to changes of position of said pressure-controlled member.

4. A fluid pressure regulator according to claim 1, in which the said outlet orifice is substantially in line with the delivery outlet, and the said antechamber has an extension across which the fluid flows in passing from the outlet orifice to the delivery outlet.

5. A fluid pressure regulator according to claim 1, including a valve seat upon which the said inlet into the plenum chamber emerges, and in which the said movable closure is in the form of a valve head adapted to move toward or from said seat in regulating the effective area of flow from said inlet, the said baffle being located on the said valve-head and projecting from the valve head toward the valve seat, and located so that it lies between the said inlet and the said outlet orifice for baffling direct flow between the said inlet and the said outlet orifice.

ERICH SCHUSTER.

References Cited in the file of this patent

UNITED STATES PATENTS

| Number | Name | Date |
|---|---|---|
| 1,515,911 | Terry | Nov. 18, 1924 |
| 2,288,733 | Niesemann | July 7, 1942 |
| 2,302,175 | Bowen | Nov. 17, 1942 |
| 2,305,975 | McKinley | Dec. 22, 1942 |